Aug. 18, 1925.
A. MOORHOUSE
1,550,091
MOTOR VEHICLE
Filed Oct. 30, 1920
3 Sheets-Sheet 1
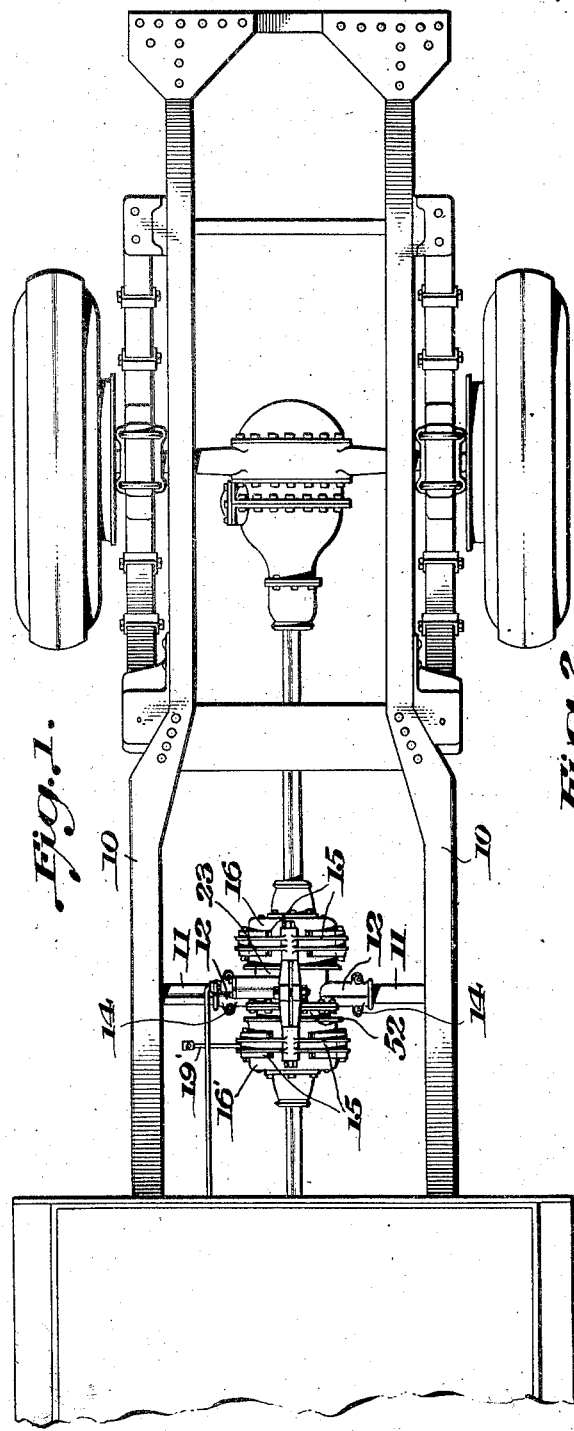
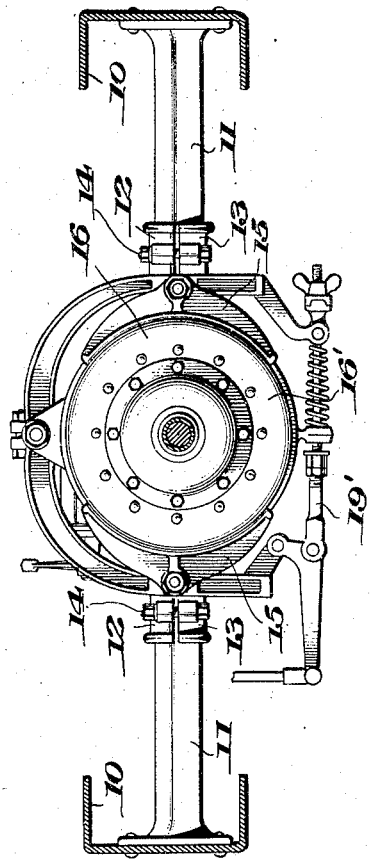
Inventor
Alfred Moorhouse,
By Milton Tibbetts
Attorney Aug. 18, 1925. 1,550,091
A. MOORHOUSE
MOTOR VEHICLE
Filed Oct. 30, 1920 3 Sheets-Sheet 2

Inventor
Alfred Moorhouse,
By
Attorney

Aug. 18, 1925.  
A. MOORHOUSE.  
MOTOR VEHICLE  
Filed Oct. 30, 1920  
1,550,091  
3 Sheets-Sheet 3

Inventor  
Alfred Moorhouse,  
By  
Attorney

Patented Aug. 18, 1925.

1,550,091

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 30, 1920. Serial No. 420,686.

*To all whom it may concern:*

Be it known that I, ALFRED MOORHOUSE, a citizen of the United States, and resident of Detroit, Wayne County, State of Michigan, have invented certain new and useful Improvements in Motor Vehicles, of which the following is a specification.

This invention relates to motor vehicles, and particularly to the change speed mechanism thereof.

The principal object of the invention is to provide a change-speed mechanism auxiliary to the usual speed changing gear box for the purpose of providing an additional speed ratio, which preferably is of such a nature as to reduce the speed of the axle and obtain greater power. The invention aims to attain the above object by means which avoid the necessity of providing an extra shaft carrying the additional change speed gears.

Another object of the invention is to provide a construction in which one of the members of a universal joint in the driving shaft line is employed as the driven element for the change speed mechanism.

Another object of the invention is to provide means whereby the housing containing the attachment is so mounted as to have a pivotal movement with respect to the frame, thus accommodating the attachment to the weaving of the frame and avoiding the necessity of an extra universal joint between the parts of the attachment and the frame.

Another object of the invention is to provide a construction adapted for the above purposes, which shall be readily attachable to and detachable from a motor vehicle of existing construction and otherwise conventional type.

With these objects and others in view, the invention is embodied in preferable form in the construction and arrangement hereinafter described and illustrated in the accompanying drawings.

In these drawings—

Figure 1 is a top plan view of part of a motor vehicle, showing the location and exterior form of the unit assembly containing the invention;

Figure 2 is a transverse sectional view of the construction shown in Fig. 1, the unit assembly being shown in end elevation;

Figure 3:
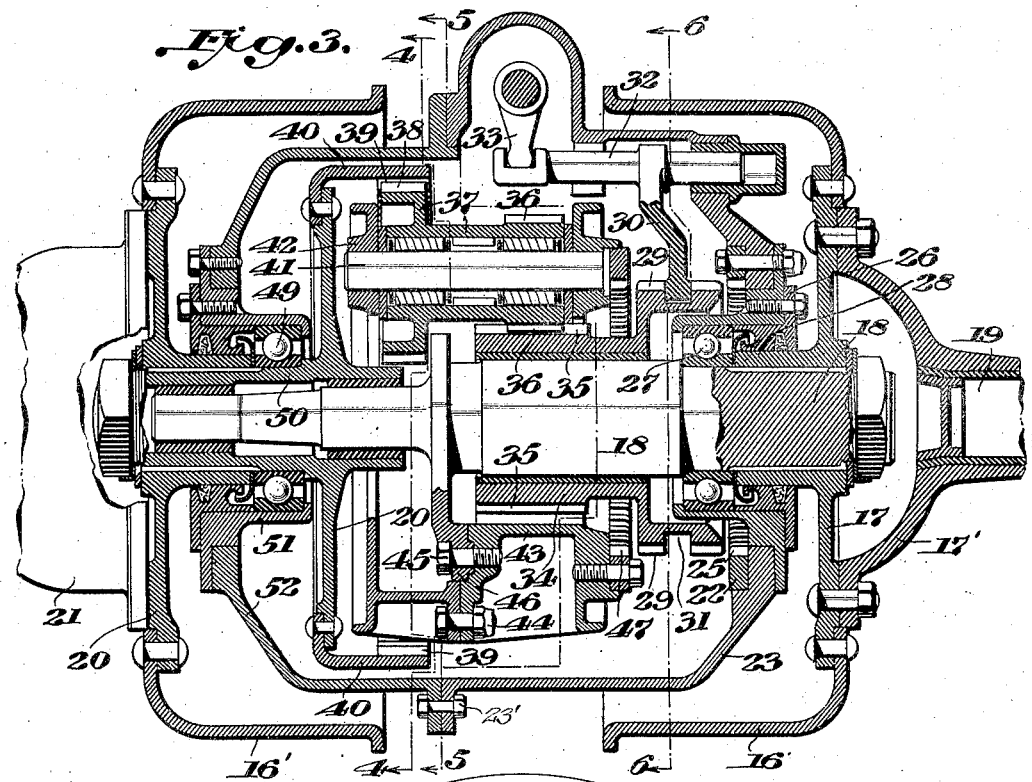
Figure 4:
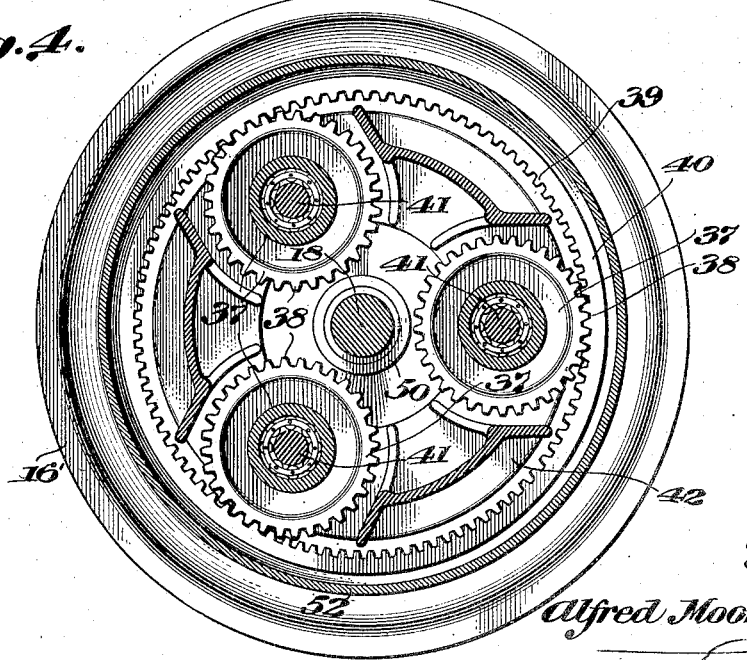
Figure 5:
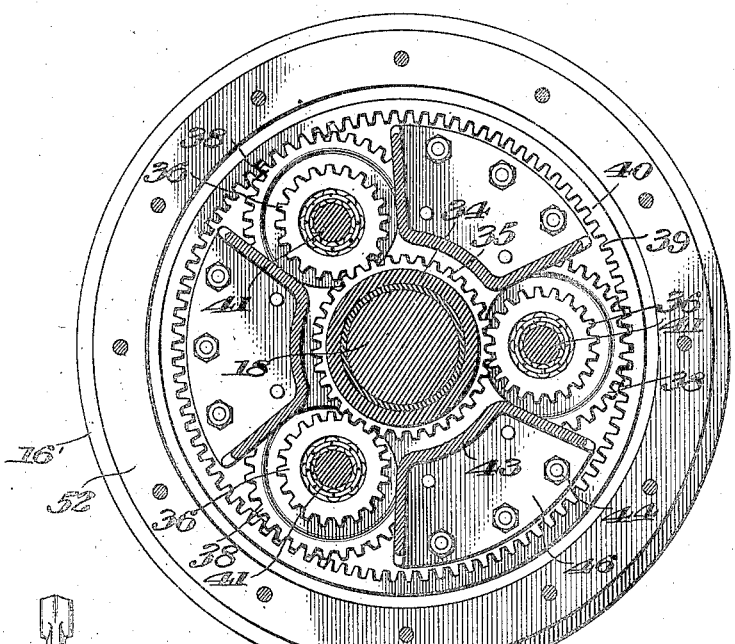
Figure 6:
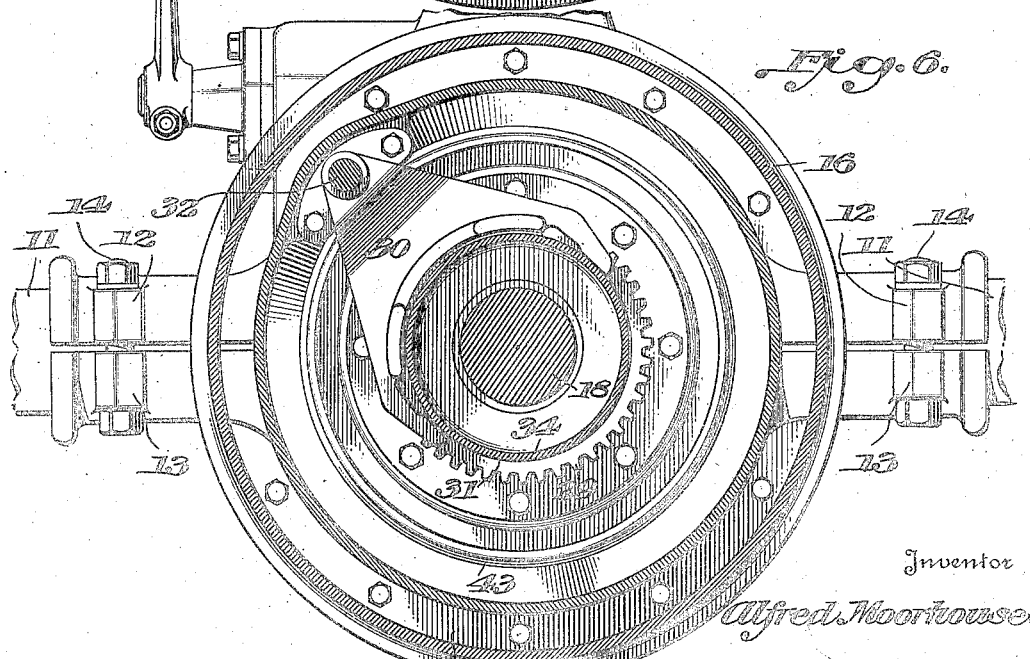

Figure 3 is an enlarged vertical, longitudinal section of the auxiliary gear box; and Figures 4, 5 and 6 are detail sectional views taken respectively on lines 4—4, 5—5 and 6—6 on Fig. 3.

Referring to the drawings, 10 indicates the side members of the motor vehicle frame and 11 is a cross tube or bar formed in two aligned and separated parts which are separately fixed to the side members at a point between the main transmission and the rear axle. Mounted on the inner ends of this cross tube is a housing comprising two parts 23 and 52 held together by means of bolts 23'. The housing has side hub portions 12 which are split as at 13 and these hub portions surround the tube parts 11. Bolts 14 clamp the casing to the tube parts leaving it sufficiently loose if desired so that it may pivot slightly on the tube. By thus mounting the housing the mechanism is easily applied to a vehicle already constructed without interfering with any of the other parts of the frame.

This housing carries brake shoes 15, one on each side of the cross tube, and these shoes are adapted to bear on brake drums 16, 16' and the shoes are actuated by lever mechanism 19'. The drum 16 is secured to a spider 17 which is keyed on a shaft 18. The shaft 18 constitutes the change speed mechanism shaft, and it is detachable from the main driving shaft line. It is connected rigidly to a main shaft line section 19, by means of said spider 17, and a similar spider 17' which is bolted to the spider 17, and fixed to said shaft section 19. The drum 16' at the opposite end of the assembly is secured to a spider 20, which forms one member of a universal joint 21.

A ring gear 22 is fixed to the housing section 23 and has teeth 25. A retainer 26 is adapted to retain the ball bearings 27, against which the inner end of a collar 28 of the spider 17 is adapted to bear. Mounted to rotate freely on the shaft 18 is a gear 29, which is capable of sliding movement on said shaft, and may be operated to effect such movement by means of a forked arm 30, entering a groove 31 formed in said gear. Said fork is carried by a shifting bar 32, which is adapted to be operated by a lever 33, which in turn may be controlled by a hand shift lever, not shown. The gear wheel 29 is provided with an extended hub 24, on which are formed teeth 35, adapted to be in continuous mesh with gear teeth 36 formed on gear members 37. These members are also provided with gear teeth 38, adapted to mesh with the teeth 39, on the internal surface of a ring 40. The members 37 constitute the planet gears and the member 40, the ring gear of an epicyclic gearing system. The planet gears 37 are mounted on stub shafts 41, which in turn are journaled in a carrier 42, which is bolted to an annular member 43 by bolts 44. The member 43 is in turn secured by bolts 45 to the flange 46, forming part of the shaft 18. An internal gear 47 is fixed to the member 43, and is adapted to mesh with the gear 29 when the latter is shifted to the left. The ring gear 40 has a flange which is bolted to the spider 20, which in turn is journaled on the shaft 18, but connects to the main shaft line through the other member of the universal joint. Bearings 49 are located between the cylindrical sleeve 50 of the spider and the retainer member 51, which is secured to a housing section 52 attached to the housing section 23, these two sections forming the housing for the planetary gearing.

This auxiliary change speed mechanism is particularly designed for imparting a reduction in speed to any speed obtained by the usual transmission. Referring to the operation of the construction, in Fig. 3 a controlling gear 29 is shown in neutral position, that is, neither in mesh with gear 25 nor gear 47, but in mesh through teeth 35 with the planet gears 36. When the gear 29 is shifted to the right or toward the engine, it will engage the internal gear 25, which is fixed to the housing, thereupon the gear 29 will be held against rotation and constitute the fixed central gear of the epicyclic system. Consequently the planet gears 36 will be rotated around their axes, and thus rotate the ring gear 40, which in turn will drive the universal joint member 20 at a speed reduced from that of a main drive shaft section 18.

Since these gears and the shift lever are entirely independent of the main change speed mechanism, it will be seen that the reduction provided by the auxiliary device may co-act with any speed ratio established by the main transmission so that at any speed of the driving shaft additional power may be applied to the axle for any desired purpose, such as to produce increased traction in driving through sand or mud or under an extra heavy load.

When the gear 29 is shifted from neutral to the left into engagement with the gear 47, which is carried by the member 43 attached to the arm 46, which in turn is fixed to the shaft 18, then the drive will be through the driving shaft 18, member 43, gear 29, gear teeth 35, gears 37, ring gear 40 and universal joint member 20. The gears 37 will not turn on their axes owing to the fact that the gear 29 is now fixed on the shaft 18, hence there will be a direct drive from the shaft 18 through the ring gear to the universal joint member without the reduction in speed obtained in the previously described operation, in which each planet gear 37 rotates on its own axis.

While I have in the above specification described one specific embodiment of the invention, it will be understood that the invention is capable of modification and that changes in the construction and in the arrangement of the cooperating parts may be made without departing from the spirit or scope of the invention as expressed in the following claims.

Having thus described my invention, what I claim and desire to secure by Letters Patent is:

1. In a motor vehicle, the combination with the frame thereof having a cross member, of a change speed gear casing pivotally mounted on said member, change speed mechanism in said casing, a driving shaft extending into one end of said casing and connected to said mechanism, and a driven shaft from said mechanism extending through the other end of the casing.

2. In a motor vehicle, in combination with a divided main driving shaft, and an auxiliary change speed mechanism mounted in the main shaft line, and including a housing having clutch teeth, a shiftable gear freely mounted on one part of the driving shaft and having teeth to engage said housing teeth, a clutch fixed to the shaft and adapted for engagement with said shiftable gear, a planet gear having constant mesh with said shiftable gear, a ring gear engaging said planet gear, a universal joint member on another separated part of the shaft and fixed to said ring gear.

3. In a motor vehicle, in combination with a divided main driving shaft, an auxiliary change speed mechanism located at the division between said parts of the driving shaft and including a secondary shaft fixed to the main driving shaft and constituting the driving element of said auxiliary mechanism, a universal joint in the main shaft including a member which is the driven element of said auxiliary mechanism, a housing for said auxiliary mechanism, a support vehicle for said housing and a pivotal connection between said housing and support.

4. In a motor vehicle, in combination, a driving shaft, and an assembly adapted for mounting as a unit upon the vehicle, and comprising a change speed mechanism and brake drums for the shaft surrounding the mechanism.

5. In a motor vehicle, transmission mechanism including driving and driven shafts, a brake drum secured to each of said shafts, and change speed gear mechanism interposed between said shafts and within said brake drums.

6. In a motor vehicle, transmission mechanism including driving and driven shafts, oppositely extending brake drums secured to said shafts and change speed gear mechanism connecting said shafts and disposed within said brake drums.

7. In a motor vehicle, a frame, transmission mechanism including driving and driven shafts, a housing pivotally mounted on said frame, change speed mechanism connecting said shafts and disposed in said housing and brake mechanism carried by said shafts and extending over said change speed mechanism.

8. In a motor vehicle, aligned driving and driven shafts, transmission mechanism connecting said shafts, spiders secured to said shafts, and brake drums secured to the spiders having flanges enclosing the transmission mechanism.

9. In a motor vehicle, aligned driving and driven shafts, spiders secured to said shafts, brake drums secured to the spiders and each having a flange projecting toward the other drum, and transmission mechanism between the spiders and within said flanges connecting the shafts.

In testimony whereof I affix my signature.

ALFRED MOORHOUSE.